Jan. 15, 1963     C. H. GERBER     3,074,015
FREQUENCY MODULATION METER
Filed Jan. 21, 1960     2 Sheets-Sheet 1
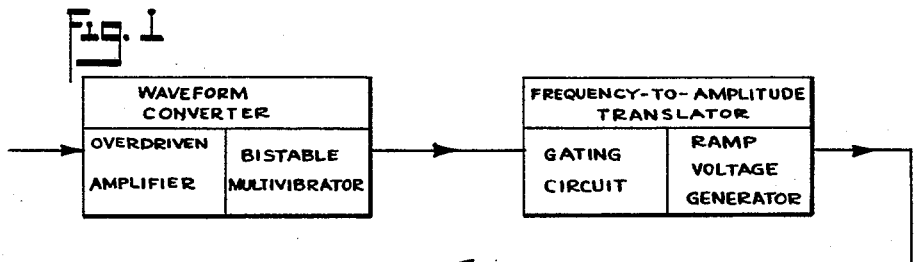
Fig. 1
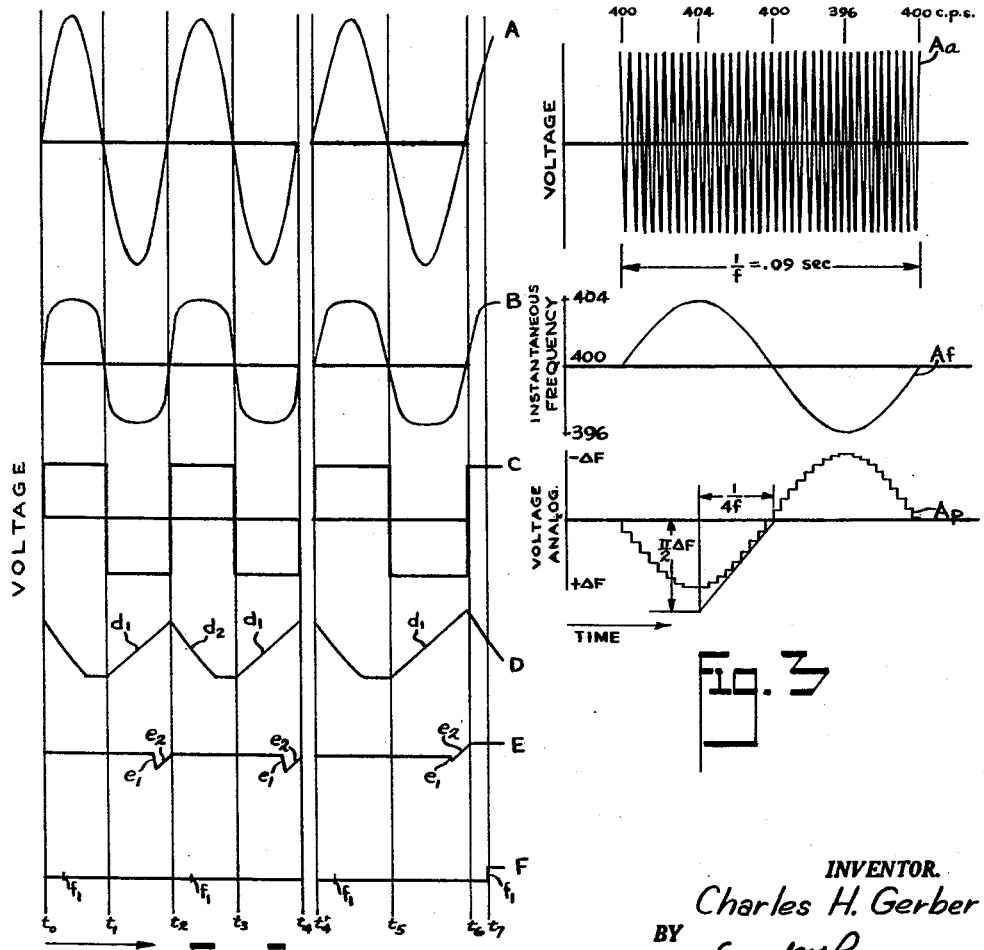
Fig. 2
Fig. 3
INVENTOR.
Charles H. Gerber
BY
His Attorney

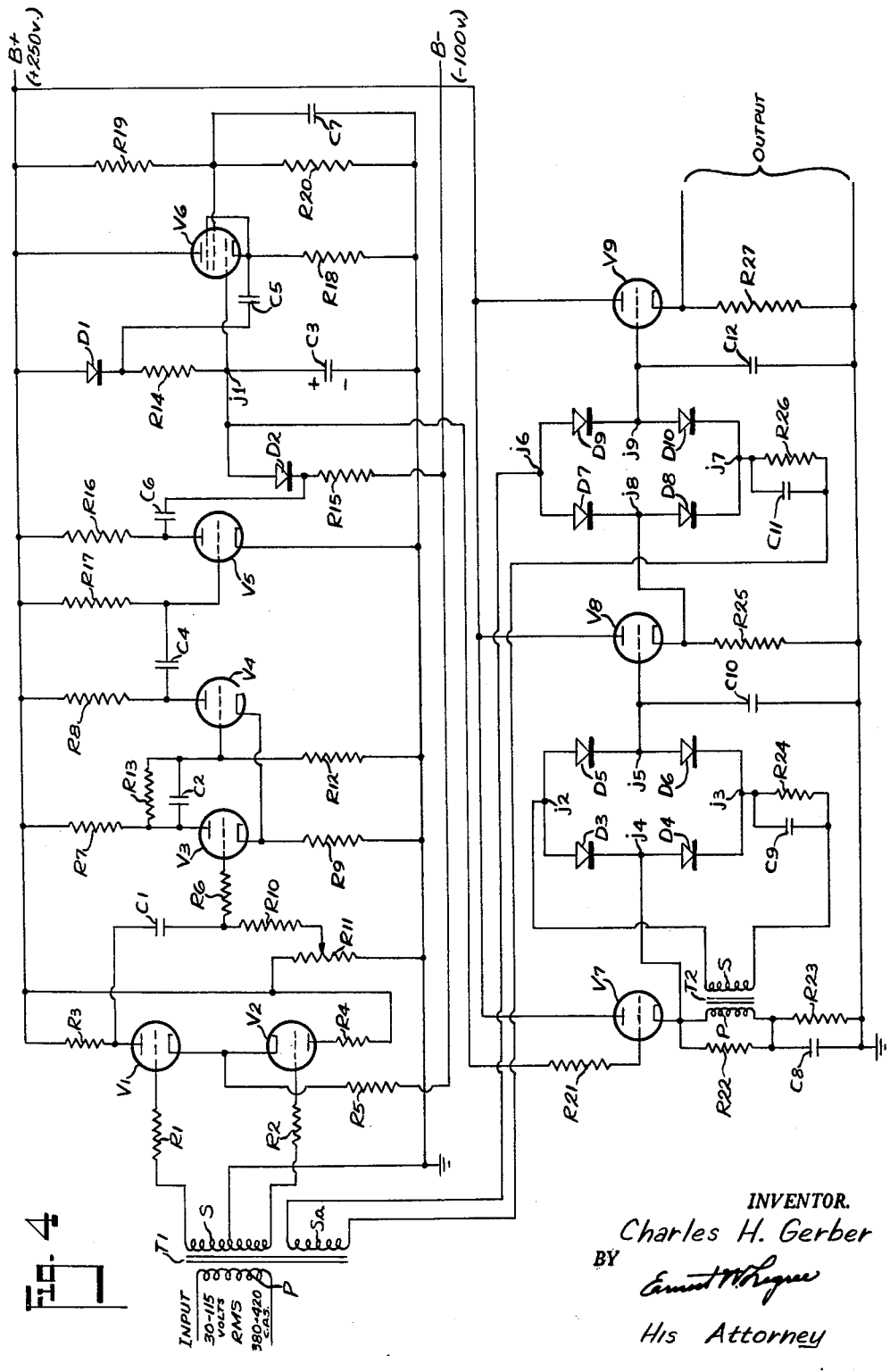

United States Patent Office 3,074,015
Patented Jan. 15, 1963

3,074,015
FREQUENCY MODULATION METER
Charles H. Gerber, Dayton, Ohio, assignor to Avtron Manufacturing Inc., a corporation of Ohio
Filed Jan. 21, 1960, Ser. No. 3,797
4 Claims. (Cl. 324—78)

This invention relates to the measurement of angular modulation, that is frequency and phase modulation, of electric waves. More specifically, the invention is concerned with a meter or test set for measuring frequency modulation and frequency transients in electrical systems.

In testing or adjusting electrical systems, particularly comparatively high frequency systems in terms of the usual power frequencies, it frequently becomes necessary to measure the percentage frequency modulation and the rate of frequency change in the electrical output. An example of such a system is a 400 cycle per second supply such as is used for aircraft and vehicular applications. The proper functioning of the equipment served by the electrical supply may depend upon the latter's compliance with established specifications in regards to the above factors, and hence the need for accurate measuring instruments.

The frequency of a periodic quantity in which time is the independant variable is defined as the number of periods occurring in unit time. In electrical measurements, it is generally measured as the number of cycles completed in one second, or as the reciprocal of the period or length of time required to complete one cycle. However frequency has an instantaneous value, even as an alternator rotor has an instantaneous speed. Instantaneous frequency may be defined as the time of change of an electric vector, voltage or current. If an A.C. voltage is represented as $e = E.\sin\theta$, where $\theta$ is the phase angle or the angle of the generator rotor which increases with time as the generator rotates, then:

$$W_t = \frac{d\theta}{dt} \text{ radians per second}$$

and $$F_t = \frac{1}{2\pi} \cdot W_t = \frac{1}{2\pi} \cdot \frac{d\theta}{dt} \text{ cycles per second}$$

where $W_t$ and $F_t$ are the instantaneous angular velocity and the instantaneous frequency respectively.

If the instantaneous frequency $F_t$ is varied or modulated with time about a carrier or nominal frequency $F$, frequency modulation is present. In the usual 400 c.p.s. system, the frequency swings or deviations are small and occur at rates which cannot be observed on a frequency meter. The magnitude of the modulation can be expressed as a percentage of the nominal (400 c.p.s.) frequency as follows:

Percent freq. mod. $= \frac{\Delta F}{F} \times 100 = \frac{F_{max} - F_{min}}{F_{max} + F_{min}} \times 100$ (I)

where $F_{max}$ and $F_{min}$ are respectively the maximum and minimum instantaneous frequencies, and $\Delta F$ is the frequency swing or deviation from the nominal frequency $F$.

In a frequency modulated wave, the instantaneous frequency may be represented by the expression:

$$F_t = F + \Delta F \cdot p(t) \quad (II)$$

where $p(t)$ is a function of time which may be cyclical or transient. The rate of frequency change due to frequency modulation is then the derivative with respect to time of the instantaneous frequency, as follows:

Freq. change rate $= \frac{d}{dt} F_t = \Delta F \cdot \frac{d}{dt} p(t) \quad (III)$ and is measured in cycles per second per second. If an electrical quantity, for instance a voltage, were made to follow the instantaneous frequency, such quantity would be a voltage analog of frequency. A recorder trace of the voltage analog of frequency would then show not only the instantaneous frequency, but also the modulating frequency and the rate of change of instantaneous frequency.

Accordingly the general object of the invention is to provide a new and improved meter circuit for measuring frequency modulation in electrical systems.

A more specific object of the invention is to provide a meter circuit particularly suitable for measuring the percentage frequency modulation.

Another object of the invention is to provide a meter circuit or system which will produce a voltage analog of the instantaneous frequency and which can be used to make a recorder trace of same.

The causes of frequency modulation in an electrical system are generally similar to those of voltage modulation and include unstable speed regulators, pulsating loads, torsional vibrations and faulty bearings. If load is applied to an alternator, the output voltage shifts in phase due to armature reaction whether the rotor speed changes or not. Ths phase transient entails an equivalent frequency modulation and a rate of frequency change. It is desired that the meter circuit of the invention and the voltage analog of frequency which it provides permit measurement of such transients.

In a typical 400 c.p.s. system, the range of percentage frequency modulation of interest is from 0 to 5%, that is $\Delta F$ may be $\pm 20$ c.p.s. while the modulatilon rate may be from 2 to 200 c.p.s. Slower rates of frequency modulation are considered to be frequency drift. By contrast in communications work, a wide-band F.M. sound channel may utilize a carrier of 71.75 megacycles and maximum $\Delta F = \pm 75$ kilocycles, so that maximum percentage frequency modulation in the present sense is only about 0.1%.

For a sinusoidal modulating signal of frequency $f$ (the cosine is used for simplicity), the expression for instantaneous frequency in Equation II becomes:

$$F_t = F + \Delta F.\cos 2\pi ft \quad (IV)$$

The instantaneous phase angle is obtained by integration as follows:

$$\theta_t = 2\pi \int_0^t F_t \cdot dt = 2\pi \int_0^t (F + \Delta F.\cos 2\pi ft) dt$$

$$\theta_t = 2\pi F t + \frac{\Delta F}{f} \cdot \sin 2\pi ft$$

(V)

The modulated carrier or wave is then given by the expression:

$$e = E.\sin \theta_t$$

$$e = E.\sin\left(2\pi F t + \frac{\Delta F}{f} \cdot \sin 2\pi ft\right)$$

(VI)

The expression $\Delta F/f$, which is generally referred to as the modulation index $\beta$, is ordinarily fractional in a 400 c.p.s. supply. By contrast in an F.M. sound channel, wherein the sound or modulating frequency may extend from 15,000 c.p.s. down to 50 c.p.s., $\beta$ may attain values in the thousands. A method of frequency modulation measurement by wave analysis which is used in communication work is based upon observing the suppression of the carrier when $\beta$ passes through the values 2.40, 5.52 etc. (whereat the Bessel coefficients of first kind and zero order, first order etc. pass through zero). This method is not practical to use in measuring 400 c.p.s. systems. Also at 400 c.p.s., frequency modulation generally exists simultaneously with voltage modulation; this causes the sidebands to be unequal, making wave analysis very difficult. The problem is compounded further by the presence of non-sinusoidal modulation and transients. Therefore a completely different approach is required.

In accordance with the invention, frequency modulation is measured by producing a voltage analog of frequency whose characteristics can readily be measured and observed. The frequency of the supply or carrier is measured at discrete intervals in a manner which may be referred to as period sampling. In a preferred embodiment of a meter circuit following the invention, the instantaneous frequency is averaged over a half cycle and this average frequency is presented as the voltage analog signal during one complete cycle. This process is repeated at each cycle. The result is a series of points separated along the time axis by intervals equal to the reciprocal of the center frequency during the sampling period. When the rate of frequency change that it is desired to measure is not greater than half that of the center or carrier frequency, a smooth curve joining the successive points will give a good approximation of the instantaneous frequency. This is the sense in which the meter circuit of the invention provides an analog or simulation of the instantaneous frequency. This method has the advantage of preventing the effects of harmonic distortion, amplitude modulation, and similar waveform departures from being recorded as frequency modulation.

In the preferred embodiment of the invention, the foregoing is effected by translating the frequency modulated wave or carrier to a triangular wave comprising a series of ramp voltages of constant slope. The ramp voltages always start at a fixed level or reference voltage and their duration corresponds to the periods of the frequency modulated wave, being actually equal to the half periods. Thus by reason of the constant slope of the ramp voltages, the ultimate amplitude or peak which they attain is proportional to the period, and therefore inversely proportional to the instantaneous frequency averaged over the half cycle.

The voltage analog is achieved by creating a voltage or signal which follows the peaks of the ramp voltages. In the preferred embodiment, the triangular wave or succession of ramp voltages is demodulated by a four-diode switch which causes the charge across a first memory capacitor to follow the peak amplitudes of the successive ramps. A second four-diode switch and memory capacitor may be used to eliminate the reset impulses which occur during the conduction intervals of the first four-diode switch. The memory capacitors are followed by cathode followers in each case to reduce the loading on the stage. The final output is a voltage analog or simulation of the instantaneous frequency which may be measured to determine the percentage frequency modulation, or displayed and recorded if desired to measure other characteristics including transients.

For additional objects and advantages and for a better understanding of the invention, attention is now directed to the following description and accompanying drawings. The features of the invention believed to be novel will be more particularly pointed out in the appended claims.

In the drawings:

FIG. 1 is a block diagram with suitable headings of a frequency modulation meter embodying the invention;

FIG. 2 shows waveforms illustrating the operation of a meter circuit according to the invention;

FIG. 3 shows waveforms of a frequency modulated wave, its instantaneous frequency, and the voltage analog of frequency as provided by the meter circuit of the present invention.

FIG. 4 is a schematic circuit diagram of a frequency modulation meter embodying the invention.

Referring to the drawings, the input wave which may for instance be a 400 c.p.s. voltage subject to up to 5% frequency modulation from 380 to 420 c.p.s. is supplied to a waveform converter comprising an overdriven amplifier followed by a bistable multivibrator, as shown in block form in FIG. 1. Curve A in FIG. 2 represents two cycles of the input wave at the nominal frequency from times $t_0$ to $t_4$, and a third cycle at a lower frequency (longer period) from $t'_4$ to $t_7$. The same wave is repeated as A$a$ in FIG. 3 but plotted on a contracted time base to show 1% frequency modulation from 396 to 404 c.p.s. at a modulation rate of 11 c.p.s. corresponding to a modulation period of .09 second. The variation in instantaneous frequency is of course too slight to be observable in wave A$a$ but it is shown by curve A$f$ as a sinusoidal variation. Curve A$f$ may be regarded as the theoretically perfect analog of instantaneous frequency which the output of the instant meter circuit must simulate.

The overdriven amplifier operates to stabilize the amplitude of the signal against wide variations in input. For instance, the input signal may vary from 30 to 115 volts R.M.S. Further, it increases the steepness of the wave at the crossover of the zero axis to assure firing of the bistable multivibrator substantially at the instant of crossover. Thus the period of the multivibrator is caused to correspond accurately to that of the input wave. The output waveform of the overdriven amplifier is illustrated by curve B in FIG. 2 and consists of a flat-topped wave with steepened sides. The output of the bistable multivibrator is a square or rectangular waveform illustrated by curve C having a constant amplitude and a period equal to that of the input wave measured at the instants of crossover of the zero axis.

In the schematic circuit of FIG. 4, electron control devices or tubes V1 and V2 constitute the overdriven amplifier, and tubes V3 and V4 constitute the bistable multivibrator. The input signal is supplied to primary P of transformer T1 having a grounded center-tap secondary S which supplies the signal in opposite phase through current limiting resistors R1 and R2 to the control grids of tubes V1 and V2. The tubes have their anodes connected to the B+ (+250 v.) supply through equal load resistors R3 and R4, but have cathode coupling through common cathode load resistor R5 which is connected to the B— (—100 v.) supply. Transformer T1 may have a primary to secondary turn ratio of 1:4. As a result, tubes V1 and V2 are rapidly driven alternately to saturation and cut-off by the input signal, and the output at either anode is flat-topped and steep-sided as shown by curve B of FIG. 2.

The signal at the anode of tube V1 is coupled by capacitor C1 and current limiting resistor R6 to the control electrode or grid of tube V3. The anodes of tubes V3 and V4 are connected to the B+ supply by load resistors R7 and R8 respectively. Cathode coupling between the tubes is provided by common cathode load resistor R9. Positive bias is provided to the grid of tube V3 by the combination of resistor R10 and potentiometer R11, and to that of tube V4 by the voltage dropping combination of resistors R12 and R13 jointly with R7. The anode of V3 is coupled to the control grid of V4 by resistor R13 paralleled by capacitor C2 to assure fast response. As a result of the couplings and bias, tubes V3 and V4 operate as a bistable multivibrator. A positive signal at the grid of V3 causes V3 to saturate and V4 to cut off until the occurrence of a negative signal which causes conditions to reverse. Thus the output at the anode of V4 is a square or rectangular wave of constant amplitude and whose periods are equal to those of the input wave, as illustrated by curve C in FIG. 2.

Referring to the block diagram of FIG. 1, the function of the frequency-to-amplitude translator is to generate a so-called triangular wave comprising a series of ramp voltages whose peak amplitudes are proportional to the periods of the square waves supplied by the waveform converter. This is accomplished by causing a gating circuit to start the charging of a capacitor at the beginning of the negative half cycle of the square wave, and to terminate the charging at the beginning of the positive half cycle. A ramp voltage generator assures that the charging rate is linear. Since the charging interval is equal to the half period and the charging rate is linear, the maximum amplitude of the ramp voltage occurring at the end of the charging period must be proportional to periods of the input wave. This is illustrated by curve D of FIG. 2, wherein it will be observed that the ramp or ascending portion $d_1$ of the curve attains a higher peak during the longer half period $t_5$ to $t_6$ than during the shorter half periods $t_1$ to $t_2$ and $t_3$ to $t_4$.

The translator is composed of the circuitry associated with tubes V5 and V6, the former acting as the gate control and the latter as the ramp voltage generator. The ramp voltage is actually developed across cumulating capacitor C3, that is between ground and the junction point $j1$ with the polarity indicated. Junction point $j1$ is connected through resistor R14 and diode D1 to +250 volts, and through diode D2 and resistors R15 to −100 volts. When both D1 and D2 are conducting, $j1$ is at ground potential and there is no charge across C3 in the absence of a signal to gate control tube V5.

The anode and grid of gate tube V5 are connected to B+ through resistors R16 and R17 respectively. When a positive signal is coupled from tube V4 through capacitor C4 to the grid of tube V5, tube V5 cannot respond because it is already at saturation. During this time, storage capacitor C5 is charged to the level of the B+ (+250 v.) supply through diode D1 and resistor R18. However when a negative signal is applied to the grid of tube V5, conduction through the tube is immediately cut off. This applies a positive voltage through capacitor C6 to the cathode side of diode D2 causing it to become non-conducting. Thus the connection of capacitor C3 (junction $j1$) to B− is effectively opened and cumulating capacitor C3 begins to charge through R14 toward B+ with the polarity indicated. Tube V6 has its anode connected to B+ and its screen grid regulated by R19, R20 and C7. As the charge voltage across C3 begins to build up, tube V6 operating as a cathode follower having a gain of nearly unity, develops a positive signal or voltage drop across cathode resistor R18. This developed voltage is applied in series with the stored charge in capacitor C5, thus raising the voltage at the junction of D1 and R14. This cuts off diode D1 and the voltage charging capacitor C3 is thus the stored charge in C5 plus the voltage drop across resistor R18 as a result of conduction through tube V6. Inasmuch as the gain of tube V6 approaches unity, the voltage or potential difference between grid and cathode remains constant at all times. Hence the voltage across R14 must remain equal to the charge in C5, and by making C5 very large relative to C3, the charge in it remains to all intents constant. As an example, C5 may have a value of .1 microfarad, and C3 a value of .0033 microfarad, the ratio being 300:1. Since the voltage across R14 is the drop due to the charging current into C3, it follows that the charging current is constant and that the charge in C3 and the voltage across it increases linearly with time. Thus the desired ramp waveform $d_1$ of FIG. 2 is obtained across cumulating capacitor C3. Furthermore since the charging rate is linear with time, that is, the ramp voltages have a constant slope, it follows that the maximum amplitude or peak voltage attained by the ramp waveforms will depend upon their time duration. In other words, the peaks will be proportional to the half period: this is seen in curve D of FIG. 2 wherein the ramp voltage $d_1$ attains a higher peak during the half period $t_5$ to $t_6$ than during the half periods $t_1$ to $t_2$ or $t_3$ to $t_4$.

At the end of the negative half cycle when the input signal to gate tube V5 suddenly goes positive, a negative signal is applied to the cathode side of diode D2 which rapidly discharges C3. The discharge waveform is relatively unimportant provided it returns C3 to zero charge before the next negative half cycle. Meanwhile, tube V6 is also cut off so that storage capacitor C5 recharges in readiness to the next negative half cycle.

Referring to the block diagram, the function of the amplitude demodulator is to recover the peaks of the ramp voltages. It is desired to obtain a waveform which follows the amplitude of the successive peaks and which remains substantially constant in between peaks. This is accomplished by the amplitude demodulator which consists of a cathode follower and a four-diode switch working into a memory capacitor. The voltage developed across the memory capacitor is shown by curve E of FIG. 2.

The ramp voltage signal across cumulating capacitor C3 is applied through current limiting resistor R21 to the grid of tube V7 which is connected as a cathode follower. A corresponding signal is developed across the primary P of transformer T2 and across its secondary S. Resistors R22, R23 and capacitor C8 determine the load and bias conditions. The secondary S applies the gating voltages at junction points $j2$ and $j3$ across the two parallel branches comprising respectively diodes D3, D4, and D5, D6 of the four-diode switch. The time constant of the charging network comprising resistor R24 and capacitor C9 determines the conduction angle through the diodes, that is at what time prior to the peak of the ramp voltages conduction will begin. When conduction takes place from $j2$ to $j3$, conduction can also take place from $j4$ to $j5$. Hence the ramp voltages across the primary P which are applied across junction points $j4$, $j5$ in series with memory capacitor C10, cause a voltage to be developed across the memory capacitor which is reset at each occurrence of conduction, to the terminal level or peak amplitude of the ramp voltage. This occurs through discharge of the memory capacitor to the instantaneous level of the ramp voltage when conduction starts, as indicated by portions $e_1$ of waveform E, followed by recharging up to the current peak of the ramp voltage, as indicated by portions $e_2$.

For a fuller explanation of the manner of operation of a four-diode switch demodulator, reference may be made to my copending application Serial No. 743,357, filed June 20, 1958, entitled Amplitude Modulation Meter, and assigned to the same assignee as the present invention. A four diode switch demodulator is particularly advantageous in the present application inasmuch as it permits accurate demodulation over a tremendous range of modulating frequencies, for instance from substantially 0 up to 200 c.p.s.

In order to produce a voltage analog of frequency which is utilizable at very low percentages of modulation, it is desirable to eliminate the reset impulses consisting of the discharge and recharge portions $e_1$ and $e_2$ of waveform E. Otherwise, the reset impulses may overcome or mask the signal which it is desired to observe. This may be accomplished through the use of a demodulator filter comprising another four-diode switch and second memory capacitor.

Referring to FIG. 4, the signal across memory capacitor C10 is first supplied to the control grid of tube V8 connected as a cathode follower and whose function is to avoid loading the memory capacitor. The signal is repeated across cathode load resistor R25 as originating from a low impedance source. The four-diode switch demodulator filter comprises diodes D7, D8 in one branch, and D9, D10 in the other branch. A gating signal is supplied by auxiliary winding Sa of transformer T1 and is applied across junction points $j6$, $j7$ in series with the charging network comprising resistor R26 and capacitor C11. The exact phasing of the gating signal is not important provided it be adjusted to cause conduction at a time other than during the occurence of the reset impulses. The signal developed across R25 is applied across junction points j8, j9 in series with second memory capacitor C12. At the instant when the gating signal causes conduction between junction points j6 and j7, conduction can take place between junction points j8 and j9; as a result, the charge on the second memory capacitor merely shifts from the prior to the current level of charge on the first memory capacitor, for instance as indicated by step $f_1$ in curve F at time $t_7$. Thus a signal similar to that across the first memory capacitor but freed of the reset impulses, is produced across second memory capacitor C12. Reference may be made again to my aforementioned copending application for a fuller explanation of the operation of a four-diode switch demodulator filter. In order not to overload the second memory capacitor, its output signal may be supplied to the grid of a cathode follower tube V9 and recovered across cathode load resistor R27, such signal being the output of the frequency meter circuit as indicated in FIG. 4.

The output signal across cathode load resistor R27 is a stepped waveform as indicated by curve $A_p$ of FIG. 3, the steps occurring at each cycle of the carrier wave or input signal and corresponding to the shifts $f_1$ in the level of charge on the second memory capacitor. The amplitude of each step is proportional to the instantaneous half period of the carrier wave of nominal frequency F. Thus curve $A_p$ is actually a voltage analog of the instantaneous period P of the carrier wave. However for frequency deviations $\Delta F$ not exceeding a few percent, $F+\Delta F$ is approximately equal to $$\frac{1}{P-\Delta P}$$

Therefore curve $A_p$ may also be described as a voltage analog of instantaneous frequency wherein a positive increment in frequency appears as a negative signal and vice versa. Accordingly, by suitable calibration, curve $A_p$ may be used to indicate directly the frequency swing $\Delta F$ of the carrier wave input.

The output signal may be supplied to a peak-to-peak reading vacuum tube voltmeter which may be calibrated to read directly the frequency modulation as a percentage of the nominal frequency.

Alternatively, the output signal $A_p$ may be displayed and observed on a cathode ray tube or any suitable recorder. This permits ready determination of not only the percentage frequency modulation, but also of the frequency of the modulation and of the rate of change of instantaneous frequency owing to modulation. Thus, referring to curve $A_p$, the percentage frequency modulation may be indicated by suitable vertical calibration, being 1% in the illustrated example. The frequency of the modulation may be indicated by calibration of the time base: since 1 cycle of modulation has a period of .09 second, the modulating frequency is 11 c.p.s. (36 cycles of the carrier per 1 cycle of modulation). The maximum rate of change of instantaneous frequency is given by the maximum slope of curve $A_p$. In the illustrated example it is $$\frac{\pi}{2}\cdot\Delta F\bigg/\frac{1}{4f}=2\pi\cdot\Delta F\cdot f=2\pi\times 4\times 11=282 \text{ c.p.s.}$$

per second. The rate of change of instantaneous frequency is given in the same fashion by the slope of $A_p$ when the modulation is a transient.

The preferred embodiment of the invention which has been described is intended as illustrative and not as limitative. Various modifications will readily occur to those skilled in the art, for instance in the types of electron control devices such as tubes or transistors and in the specific circuit arrangements for carrying the essential functions or operations for a frequency meter circuit in accordance with the invention. The appended claims are therefore intended to cover any such modifications coming within the true spirit and scope of the invention.

What I claim as new and desire to secure by Letters Patent of the United States is:

1. A frequency modulation meter circuit for providing a voltage analog of the instantaneous frequency of a frequency modulated input wave, comprising a waveform converter providing a rectangular wave output of constant amplitude and of period equal to that of said input wave, a frequency-to-amplitude translator comprising a gate control circuit responsive to said rectangular wave and a ramp voltage generator including a cumlating capacitor and means responsive to half period gating signals from said gate control circuit causing said cumulating capacitor to charge linearly thereby producing ramp voltages having peak amplitudes proportional to the periods of said reactangular waves, and an amplitude demodulator comprising a four diode switch having two parallel branches each including a pair of serially connected diodes, and circuit means connecting said cumulating capacitor to said four diode switch, said circuit means including connections applying said ramp voltages across said two branches in series with a charging network limiting conduction to a restricted angle near the peaks of said ramp voltages, and other connections applying said ramp voltages across the junction points of the diodes in said two branches in series with a memory capacitor, whereby to develop across said memory capacitor a charge which follows the successive peaks of said ramp voltages and corresponds to said instantaneous frequency.

2. A frequency modulation meter circuit for providing a voltage analog of the instantaneous frequency of a frequency modulated input wave, comprising a waveform converter providing a rectangular wave output of constant amplitude and of period equal to that of said input wave, a frequency-to-amplitude translator comprising a gate control circuit responsive to said rectangular wave and a ramp voltage generator including a cumulating capacitor connected to a charging circuit containing a first diode for charging from a source of one polarity, and to a discharging circuit containing a second diode for discharging to a source of opposite polarity, said gate control circuit having an output connection to said second diode for blocking it off and effectively opening said discharging circuit during half cycles of said rectangular wave whereby to allow said cumulating capacitor to charge through said charging circuit, means for maintaining the charging current through said charging circuit constant comprising a cathode follower having input and output circuits, a series resistor in said charging circuit connected into said input circuit, a storage capacitor of large size relative to said cumulating capacitor, said storage capacitor being connected through said output circuit into said charging circuit to maintain constant current flow into said cumulating capacitor during said half cycles thereby producing ramp voltages having peak amplitudes proportional to the periods of said input wave, and an amplitude demodulator comprising a four diode switch having two parallel branches each including a pair of serially connected diodes, and circuit means connecting said cumulating capacitor to said four diode switch, said circuit means applying said ramp voltages across said two branches in series with a charging network and also across the junction points of the diodes in said two branches in series with a memory capacitor, whereby to develop across said memory capacitor a charge which follows the successive peaks of said ramp voltages and corresponds to said instantaneous frequency.

3. A frequency modulation meter circuit for providing a voltage analog of the instantaneous frequency of a frequency modulated input wave, comprising a waveform converter providing a rectangular wave output of constant amplitude and of period equal to that of the input wave, a frequency-to-amplitude translator comprising a gate control circuit responsive to said rectangular wave and a ramp voltage generator including a cumulating capacitor and means responsive to half period gating signals from said gate control circuit causing said cumulaitng capacitor to charge linearly thereby producing ramp voltages having peak amplitudes proportional to the periods of said rectangular waves, and an amplitude demodulator comprising a four diode switch having two parallel branches each including a pair of serially connected diodes, and circuit means connecting said cumulating capacitor to said four diode switch, said circuit means applying said ramp voltages across said two branches in series with a charging network and also across the junction points of the diodes in said two branches in series with a memory capacitor, and another four diode switch, circuit means connecting said memory capacitor to apply the voltage developed therein across the junction points of the diodes in the two branches of said other switch in series with another memory capacitor, and means applying a signal across the two branches of said other switch in series with a charging network allowing conduction in said other switch at different times than in said first-mentioned switch in order to develop across said other memory capacitor a voltage corresponding closely to said instantaneous frequency.

4. A frequency modulation meter circuit for providing a voltage analog of the instantaneous frequency of a frequency modulated input wave, comprising a waveform converter providing a rectangular wave output of constant amplitude and of period equal to that of said input wave, a frequency-to-amplitude translator comprising a gate control circuit responsive to said rectangular wave and a ramp voltage generator including a cumulating capacitor connected to a charging circuit for charging from a source of one polarity, and to a discharging circuit for discharging to a source of opposite polarity, said gate control circuit operating to effectively open said discharging circuit during half cycles of said rectangular wave whereby to allow said cumulating capacitor to charge through said charging circuit, means for maintaining the charging current through said charging circuit constant whereby to produce across said cumulating capacitor ramp voltages having peak amplitudes proportional to the periods of said rectangular waves, and an amplitude demodulator comprising a first four diode switch having two parallel branches each including a pair of serially connected diodes and circuit means connecting said cumulating capacitor to said first four diode switch, said circuit means including a cathode follower with an output circuit applying said ramp voltages across said two branches in series wth a charging network limiting conduction to a restricted angle near the peaks of said ramp voltages, said output circuit having other connections applying said ramp voltages across the junction points of the two diodes in each branch in series with a first memory capacitor whereby to develop across said first memory capacitor a charge which follows the peaks of said ramp voltages but which contains reset impulses during said conduction angles, and a second four diode switch having two parallel branches each including a pair of serially connected diodes, circuit means connecting said first memory capacitor to said second four diode switch, said latter circuit means including a cathode follower with an output circuit applying the charge developed across said first memory capacitor across the junction points of the two diodes in each branch of said second switch, and means applying said input wave across the two branches of said second switch in series with a charging network providing conduction through said second switch at times other than said conduction angles through said first switch, whereby the charge developed across said second memory capacitor follows the peaks of said ramp voltages as in said first memory capacitor but without the reset impulses and thereby constitutes an accurate analog of the instantaneous frequency of said input wave.

References Cited in the file of this patent
UNITED STATES PATENTS

| | | |
|---|---|---|
| 2,462,024 | Johnson | Feb. 15, 1949 |
| 2,562,913 | Heeren | Aug. 7, 1951 |
| 2,625,662 | Gaynor et al. | Jan. 13, 1953 |
| 2,688,075 | Palmer | Aug. 31, 1954 |
| 2,755,380 | Laverty et al. | July 17, 1956 |
| 2,790,898 | Bady | Apr. 30, 1957 |
| 2,829,251 | Patton | Apr. 1, 1958 |
| 2,835,809 | Taylor | May 20, 1958 |
| 2,878,448 | Maxey | Mar. 17, 1959 |
| 2,921,260 | Crandon et al. | Jan. 12, 1960 |
| 2,962,673 | Gerber | Nov. 29, 1960 |
| 2,991,416 | Ramp et al. | July 4, 1961 |

OTHER REFERENCES

"Frequency Transient Measurements in Power Systems," article in Electrical Engineering, June 1959.